June 7, 1949.   N. O. BERGQUIST   2,472,513
BELT DRIVING DEVICE
Filed Feb. 20, 1946
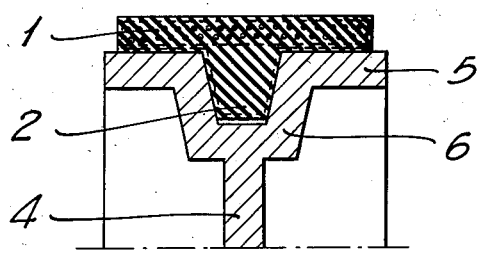
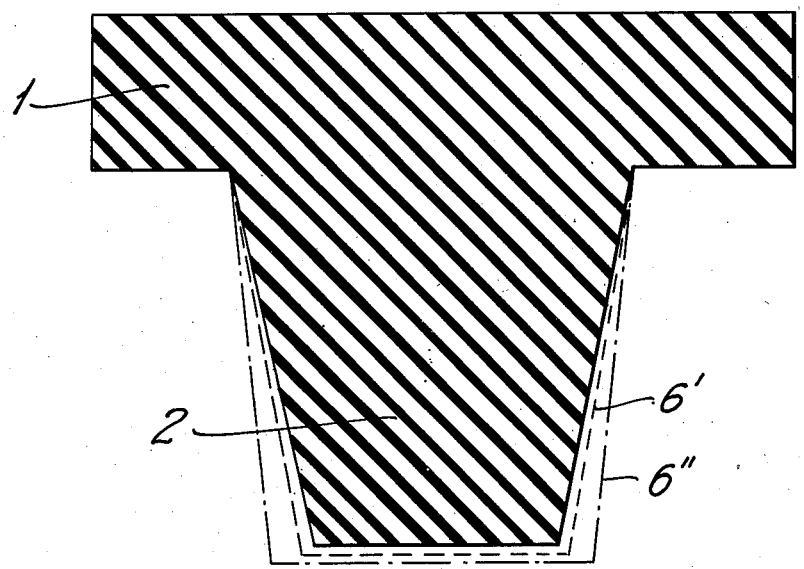
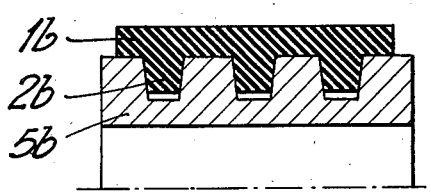 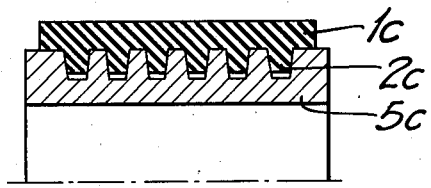
Inventor
Nils Olof Bergquist
by Sommers & Young
Attorneys Patented June 7, 1949

2,472,513

UNITED STATES PATENT OFFICE 2,472,513

BELT DRIVING DEVICE

Nils Olof Bergquist, Appelviken, near Stockholm, Sweden

Application February 20, 1946, Serial No. 648,981
In Sweden February 26, 1945

1 Claim. (Cl. 74—229)

Belt driving devices are well known, in which the belts have a flat cross section. When in these belt drives the centre distance of the pulleys is very short or if the number of revolutions is very high or in both these cases such belts make it necessary to use high belt pressures and high bearing pressures in order to avoid slipping. Another disadvantage of these belt drives consists therein that they do not allow high transmission ratios.

On account of these difficulties belt drives in which the belts are wedge-shaped or cone-shaped in cross-section, have been used to a very large extent. A such belt drive generally comprises an endless belt made of vulcanized rubber and provided with reinforcing cords or canvas embedded therein, but the belt also can be of leather or another suitable material or can be made as a rope or cable of hemp or jute or the like. The cross-section of a wedge-shaped belt usually consists of a parallel trapezium the parallel sides of which are the external and internal sides of the belt. The wedge-belt generally runs over two pulleys having circumferential grooves of a corresponding shape. The groove has a greater depth than the corresponding dimension of the belt in order to secure jamming or gripping of the belt in the V-grooves. When the belt is going to run off from the pulley, the belt often has been forced so deep in the groove that it must be drawn out from the groove. Of course, this means substantial losses of power as well as an increased wear.

The present invention has for its object to create a belt drive in which both the disadvantages of flat belts and wedge-belts are eliminated. Thus, the belt drive according to the invention shall be as free from slipping as wedge-belt drives, and at the same time it shall be of such construction that the belt will run off from the pulleys as easily as a flat belt.

According to the main feature of the invention the belt shall firmly engage or grip each pulley during its running over the same in bended condition but shall easily disengage the pulley as soon as the belt runs in straight condition from the pulley, viz. in the direction of a tangent to the pulley.

The invention will be more clearly understood from the following description of an embodiment, illustrated by way of example in the annexed drawing.

Fig. 1 shows a cross-section through the belt and the adjacent portion of a pulley over which the belt is running.

Fig. 2 shows in a larger scale and only diagrammatically the middle portion of the belt shown in Fig. 1.

Figs. 3 and 4 show modifications of the belt drives according to the invention.

In the embodiment illustrated in Fig. 1 the belt consists of a flat main portion 1 for transmitting the essential part of the driving power, and an inwardly projecting ridge 2 integral with said main portion and extending in the longitudinal direction of the belt. Thus, the cross-section of the belt is substantially in the shape of a depressed T. The belt preferably may be made of vulcanized rubber or another elastic material and reinforcing layers of cords or canvas may be embedded in the main portion 1. The pulley 4 has a substantially cylindrical portion 5 for cooperation with the main portion 1 of the belt and a circumferential groove 6 in said cylindrical portion 5, which groove corresponds to the ridge 2 of the belt.

The cross-section of the groove 6 in the pulley is made somewhat larger than the cross-section of the ridge 2 of the belt 1. In Fig. 2 two different cross-sections of the groove in relation to the ridge on a straight portion of the belt are indicated by the dotted lines 6' and 6". Supposing that a straight portion of the belt touches a pulley as a tangent, the ridge 2 shall not exert any substantial pressure on the side walls of the groove 6. When the belt is bent over the pulley, the ridge 2 is shortened and compressed under deformation. The ridge becomes wider in lateral direction, fills up the groove and exerts a pressure against the side walls of the groove, which pressure prevents slipping of the belt over the pulley in the circumferential direction or at least makes such slipping more difficult. When the belt becomes straight again, viz. runs off from the pulley in the tangential direction, the ridge again obtains its original shape, the pressure against the side walls of the groove disappears, and this portion of the belt now is not firmly connected to the pulley, viz. gripped in the same.

The shape of the groove is, preferably, made in dependence of the diameter of the pulleys. Thus, the lateral extension of the bottom of the groove should be larger, the smaller the pulley is, because a more abrupt bending of the belt causes a greater expansion of the ridge. This is shown in Fig. 2, in which the line 6' indicates the shape of a groove in a larger pulley and the line 6" indicates the shape of a groove in smaller pulley. Under no circumstances the groove is made larger than the cross-section of the ridge of the belt when bent over the pulley. The opening of the groove may be the same independent of the diameter of the pulley.

Fig. 3 illustrates a belt 1b having three longitudinal ridges 2b, and a portion of a pulley 5b having a corresponding number of grooves. Fig. 4 shows a belt 1c having six ridges 2c, and a pulley 5c having six corresponding grooves. Of course, the belt and the pulleys may be provided even with greater numbers of ridges and grooves.

It is an essential feature of the invention that the flat main portion 1 of the belt serves to transmit the essential part of the power, whereas the ridge or the ridges cause a firm grip of the belt in the pulley when bent over the same.

The pulley according to the invention may, in other respects, be carried out in all known manners and for all known purposes, for instances, as a part of a friction clutch or a claw coupling or the like.

What I claim is:

A belt driving device, comprising, in combination, a belt having a main portion for transmitting the essential part of the driving power and having at least one ridge integral with said main portion and extending in the longitudinal direction of the belt, and a pulley having a substantially cylindrical portion contacting said main portion of the belt and at least one circumferential groove in said cylindrical portion, which groove corresponds to the ridge of the belt, said ridge and said groove being of such shape and dimensions, that on a straight part of the belt the ridge does not entirely fill up the groove laterally but when running over a pulley in bent condition will fill up the groove laterally and exert a pressure on the side walls of the groove on account of the deformation caused by the bending of the belt over the pulleys.

NILS OLOF BERGQUIST.

REFERENCES CITED

The following references are of record in the file of this patent:

UNITED STATES PATENTS

| Number | Name | Date |
|---|---|---|
| Re. 15,935 | Davis | Oct. 28, 1924 |
| 2,067,400 | Koplin | Jan. 12, 1937 |